US010447670B2

(12) United States Patent
Erez et al.

(10) Patent No.: US 10,447,670 B2
(45) Date of Patent: Oct. 15, 2019

(54) SECRET KEYS MANAGEMENT IN A VIRTUALIZED DATA-CENTER

(71) Applicant: Red Hat Israel, Ltd., Ra'anana (IL)

(72) Inventors: Daniel Erez, Tel-Aviv (IL); Nir Soffer, Givataim (IL)

(73) Assignee: Red Hat Israel, Ltd., Raanana (IL)

( * ) Notice: Subject to any disclaimer, the term of this patent is extended or adjusted under 35 U.S.C. 154(b) by 335 days.

(21) Appl. No.: 15/222,331

(22) Filed: Jul. 28, 2016

(65) Prior Publication Data

US 2018/0034791 A1 Feb. 1, 2018

(51) Int. Cl.
*H04L 29/06* (2006.01)
*G06F 9/455* (2018.01)
*G06F 21/50* (2013.01)
*G06F 21/53* (2013.01)
*G06F 21/62* (2013.01)

(52) U.S. Cl.
CPC ........ *H04L 63/061* (2013.01); *G06F 9/45558* (2013.01); *G06F 21/50* (2013.01); *G06F 21/53* (2013.01); *G06F 21/6209* (2013.01); *G06F 2009/45579* (2013.01); *G06F 2009/45587* (2013.01)

(58) Field of Classification Search
CPC . G06F 9/45; G06F 9/455; G06F 12/02; G06F 9/44; G06F 9/45558; G06F 21/50; G06F 21/53; G06F 21/6209; H04L 63/061
USPC ............... 713/171; 718/1; 717/174; 380/277
See application file for complete search history.

(56) References Cited

U.S. PATENT DOCUMENTS

| 8,443,456 | B2 | 5/2013 | van der Linden |
| 9,043,933 | B2 | 5/2015 | Watanabe |
| 9,227,139 | B2 | 1/2016 | Mamtani et al. |
| 9,246,891 | B1 | 1/2016 | Kobets et al. |
| 9,292,673 | B2 | 3/2016 | Rutkowski et al. |
| 9,306,737 | B2 | 4/2016 | Hayton et al. |
| 9,535,739 | B2 * | 1/2017 | Lee .......................... G06F 9/455 |
| 9,767,017 | B2 * | 9/2017 | Talagala .............. G06F 12/0246 |

(Continued)

OTHER PUBLICATIONS

S. Saranya, et al., "Finding Anonymity Users for Secure Cloud Storage", International Journal of Scientific Engineering and Applied Science (IJSEAS)—vol. 2, Issue-4, Apr. 2016 (5 pages).

(Continued)

*Primary Examiner* — Thanhnga B Truong
(74) *Attorney, Agent, or Firm* — Lowenstein Sandler LLP (57) ABSTRACT

Implementations of the disclosure provide for secret keys management in a virtualized data-center. In one implementation, a system is provided. The system comprising a memory to store secret key data and a processing device coupled to the memory. The processing device is to detect activation of a hypervisor on a host system. A request is received from a virtual machine (VM) associated with the hypervisor to access a data storage domain. A secret key providing authenticated access to a data storage device domain is registered to the hypervisor. The secret key includes a universally unique identifier (UUID). To register the secret key, the processing device is to store a data structure indicating an association between the UUID of the secret key and the hypervisor in a volatile memory associated with the processing device. Thereupon, the UUID of the secret key is transmitted to the hypervisor associated with the VM.

18 Claims, 6 Drawing Sheets

(56) References Cited

U.S. PATENT DOCUMENTS

2006/0126848 A1* 6/2006 Park ............... H04L 9/3271
                                            380/277
2010/0082991 A1   4/2010 Baldwin et al.

OTHER PUBLICATIONS

S. Berger, et al., "Security for the Cloud Infrastructure: Trusted Virtual Data Center Implementation", IBM 2009 (12 pages).
"Securing Data in the Cloud", Porticor Cloud Security [www.porticor.com], 2013 (7 pages).

* cited by examiner

SECRET KEYS MANAGEMENT IN A VIRTUALIZED DATA-CENTER

TECHNICAL FIELD

The implementations of the disclosure relate generally to data storage management and, more specifically, secret keys management in a virtualized data-center

BACKGROUND

The virtualization of a data center results in an abstraction of a physical system to consolidate the data center infrastructure and increase operational efficiencies. A virtual machine (VM) may be a software-based emulation of computer hardware. For example, the VM may operate based on computer architecture and functions of computer hardware resources associated with hard disks or other such memory.

BRIEF DESCRIPTION OF THE DRAWINGS

The disclosure can be understood more fully from the detailed description given below and from the accompanying drawings of various implementations of the disclosure. The drawings, however, should not be taken to limit the disclosure to the specific implementations, but are for explanation and understanding only.

The disclosure is illustrated by way of examples, and not by way of limitation, and may be more fully understood with references to the following detailed description when considered in connection with the figures, in which.

DETAILED DESCRIPTION

The disclosure provides techniques for secret keys management in a virtualized datacenter. The virtualized data-center may include a plurality of host computer systems managed by a virtualization manager. Each host computer system (also referred to herein as a "host") may be communicatively coupled, via a network, to one or more storage domains that store disk images of a virtual machine (VM). The VM may emulate a physical computing environment, but requests for a hard disk or memory may be managed by a virtualization layer of a host machine/device to translate these requests to the underlying physical computing hardware resources. This type of virtualization results in multiple VMs sharing physical resources.

"Data Storage domain" herein refers to an atomic storage unit, such as a mount point or a folder for a file based storage, or a group of logical unit numbers (LUNs) for a block-based storage. A data storage domain may comprise one or more block devices, one or more storage devices, one or more file systems, one or more volumes, and/or portions thereof. The data storage domains may be employed for storing one or more of the virtual disks or disk images for the VMs.

The VM may reference a virtual disk (also referred to as a disk image) that comprises one or more volumes. Each host computer system may be communicatively coupled, via a network, to one or more storage domains that store disk images of the VMs. In some implementations, the VMs on each host computer system may be executed by a host management system, such as a hypervisor, that is in communication with the virtualization manager via the network.

In some situations, a particular VM that is attached to a storage domain may need to be migrated from one host computer to another host computer. For example, there could be a malfunction that causes a specific host to be slower than normal. In this case, the performance of the entire system may benefit by moving the VM from the malfunctioning host. In other example, the VM may be migrated for network consolidation or other types of network performance benefits.

When a VM that is attached to a disk is spawned by a hypervisor, the VM needs to be authenticated in order to be able to access the storage domain associated with the disk. In some cases, the hypervisor may need to access the authentication credentials for this disk. In one implementation, the authentication credentials may be copied to a file and the file can be installed in a directory on disk. In such cases, the file may need to be copied to each host so that a hypervisor on that host can access the credentials. This can lead to security issues because each host must store a copy of the authentication credentials on disk.

In accordance with the present disclosure, techniques are provided to manage a secret key (e.g., a data structure used for authentication of storage users by a data storage domain) so that it can be securely transferred to access a data storage domain associated with a VM. In some implementations, the system may execute a process or key management service associated with the virtualization manager that can issue a request for a secret key to be created, for example, by the data storage domain or a third party service. In some implementations, the virtualization manager may detect a request from a hypervisor associated with a virtual machine that needs access a disk on the data storage domain. In turn, the virtualization manager executes a call associated with the key management service to register the secret key to the hypervisor. When the secret key is registered with the key management service, the service keeps, in volatile memory, a data structure (e.g., a table) indicating an association between a universally unique identifier (UUID) for the key and the hypervisor that is registered to key. Because data structure comprising the UUID for the key is only kept in volatile memory, when either the service or the hypervisor are re-started the UUID for the key is cleared from the volatile memory and, therefore the key needs to be re-registered to the hypervisor before the data storage domain can be accessed, for example, by a VM associated with the hypervisor.

If the virtualization manager of the system detects that a new virtual machine is spawned, the key management service identifies the UUID associated with the secret key associated with a data storage domain to be accessed by the virtual machine. For example, the data storage domain may store a disk image for the new virtual machine. At the time of spawning the new virtual machine, the identified UUID for the secret key is then transferred by the key management service of the virtualization manager to the hypervisor associated with this virtual machine. This in turn allows the virtual machine to use the UUID to access, via the key management service, the secret key which was registered before to the hypervisor upon activation. In this regard, the key management service does not allow the secret key to be made available to any other process associated with the hypervisor other than the virtual machine using the UUID for the key. In some implementations, the virtual machine may then use the UUID to make a request to the key management service to provide the secret key for connection to the data storage domain.

In some implementations, the key management service of the virtualization manager can unregister secret keys associated with a specific storage domain. For example, the key management service can unregister keys by deleting any UUIDs for the secret keys associated with the specific storage domains on relevant hypervisors. The service may also unregister secret keys is certain situations, such as if the service detects that the data storage domain is deactivated, if the hypervisor is shutdown or other situations. The unregistering of the secret key helps clean up any unneeded keys in order to keep the keys secure. In some implementations, the key management service may unregister the secret keys in response to a command input provided by a user, such as a system administrator. If the system detects that the storage domain or hypervisor has reactivated, the key management service re-registers the secret key upon detecting an access request to the disk by the virtual machine using the key.

Figure 1:
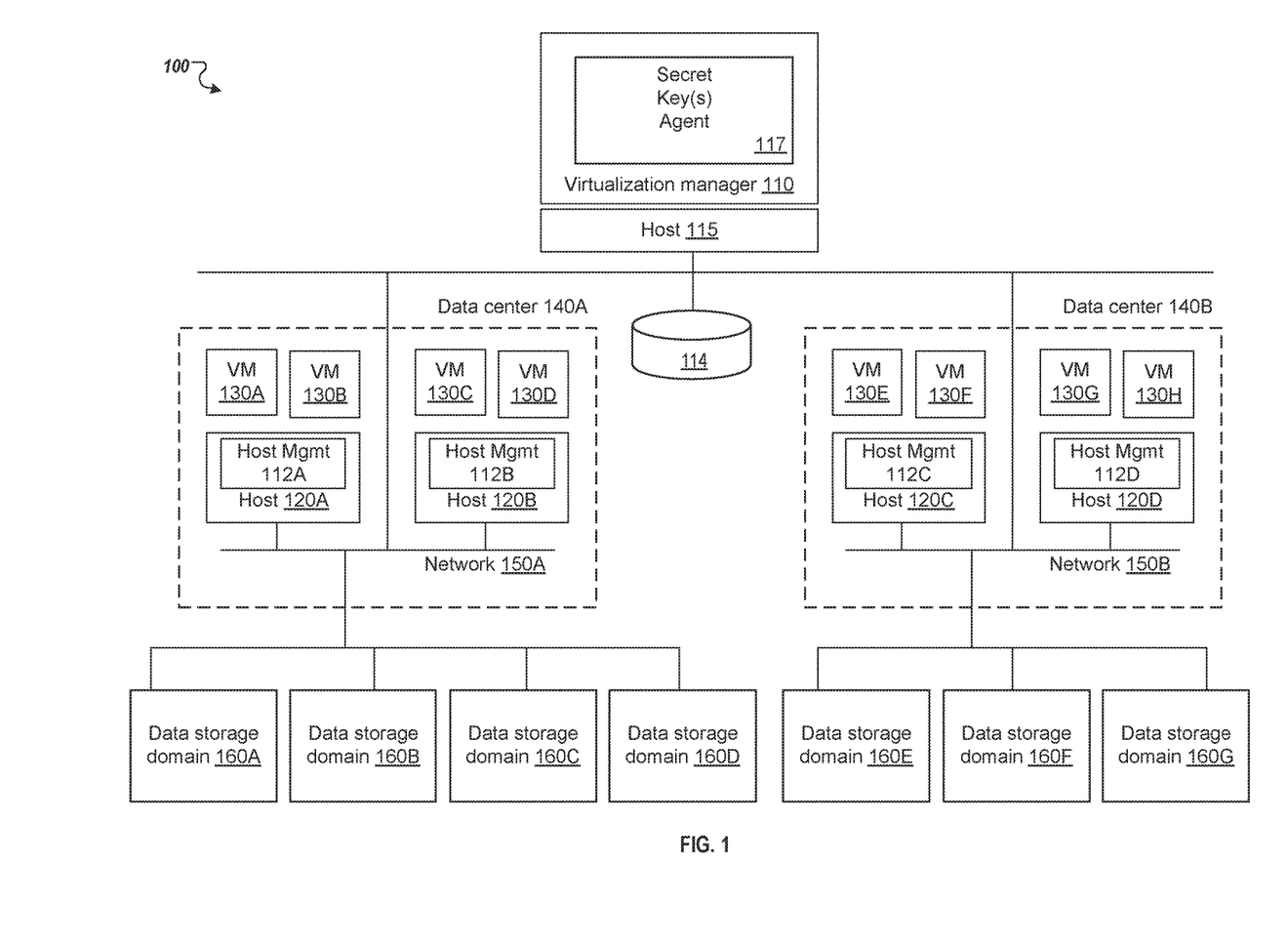
FIG. 1 is a block diagram of a distributed computer system representing a virtualized environment in which implementations of the disclosure may operate.

FIG. 1 is a block diagram of a distributed computer system 100 representing a virtualized environment. In the illustrative example of FIG. 1, computer system 100 comprises a virtualization manager 110 and a plurality of host computer systems 120A-120D grouped into one or more logical groups which may be also referred to as "data centers" 140A-140B. Virtualization manager 110 refers to one or more software modules being executed by a host computer system 115 for centralized management of the virtualized environment. Virtualization manager 110 may comprise various interfaces, including administrative interface, reporting interface, and/or application programming interface (API) to communicate to host computers 120A-120D of the managed virtualized environment, as well as to user portals, directory servers and various other components which are omitted from FIG. 1 for clarity.

In one implantation, the virtualization manager 110 may access a database 114, which may run on the host computer system 115 or in a separate database server (not shown). Database 114 may, e.g., be a relational database, an object-oriented database, an object-relational database, etc. The database 114 may store data, e.g., configurations, settings, and status related to VM host computer systems 120A-120D and references (e.g., IP addresses) of the data storage domains 160A-160G as well as other relevant information.

Each of the host computer systems 115, 120A-120D may comprise one or more processors communicatively coupled to memory devices and input/output (I/O) devices, as described in more details herein below with references to FIG. 6. Each of host computer systems 115, 120A-120D may run a plurality of virtual machines 130A-130H, by executing a hypervisor to abstract the physical layer, including processors, memory, and I/O devices, and present this abstraction to the virtual machines as virtual devices.

Each of the virtual machines 130A-130H may execute a guest operating system which may utilize the underlying virtual devices, including virtual processors, virtual memory, and virtual I/O devices. One or more applications may be running on the virtual machines 130A-130H under the guest operating system.

Each of the host computer systems 120A-120D may run a host management module 112A-D that manages and monitors various aspects of the host operation, including the storage, memory and network interfaces. In an illustrative example, host management modules 112A-D may be provided by a Virtual Desktop and Server Management (VDSM) daemon.

In certain implementations, host computer systems 120A-120D may be grouped into one or more logical groups which may be also referred to as "data centers" 140A-140B. A data center may represent the highest level of abstraction in the virtualization model. Each data center 140 may be communicatively coupled, via a network 150A-150B, to one or more storage domains, including data storage domains 160A-160G. The data storage domains 160A-160G may store disk images (not shown) of virtual machines 130A-130H. In some situations, the virtualization manager 110 may receive a request to decommission t one or more of the data storage domains 160A-160G. For example, one or more of the data storage domains 160A-160G the may be decommissioned because they have become obsolete or are malfunctioning.

In accordance with one or more aspects of the disclosure, virtualization manager 110 may comprise a key management service, such as secret keys agent 117, to facilitate operations of the computer system 100 for securely managing secret keys for accessing storage domains (e.g., data storage domains 160A-160G). The functionally of the secret keys agent 117 can exist in a fewer or greater number of modules than what is shown, with such modules residing at one or more processing devices of computer system 100, which may be geographically dispersed. The agent 117 may be operable in conjunction with virtualization manager 110 from which it may receive and determine relevant information regarding the data storage domains 160A-160G and any active virtual machines 130A-130H associated with those domains in the virtualized data-center. Thereupon, the agent 117 may provide authentication credentials to access a domain without adversely impacting the security of the computer system 100 as discussed in more detail below with respect to FIGS. 2 through 6.

Figure 2:
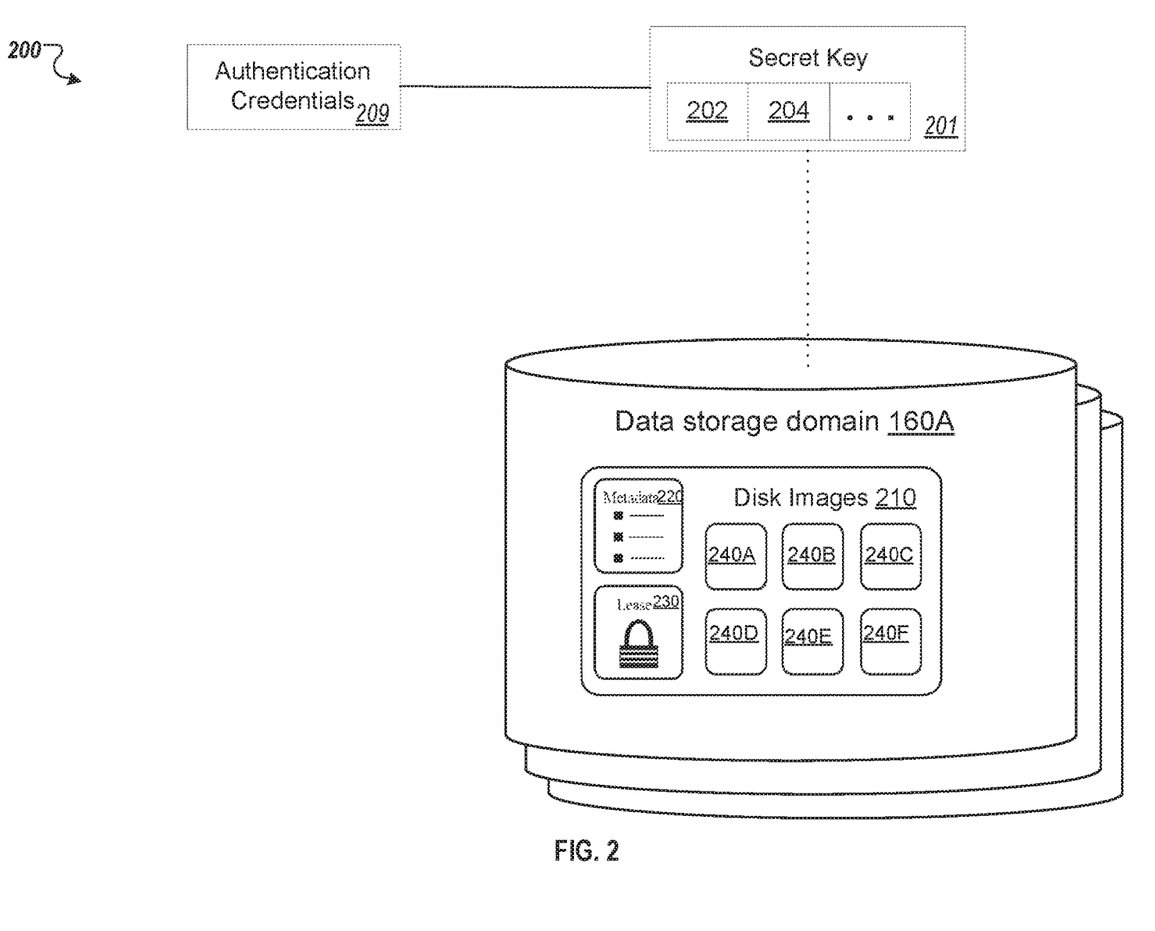
FIG. 2 illustrates an example functional a system comprising data structures in accordance with one or more aspects of the disclosure.

FIG. 2 illustrates an example a system 200 comprising data structures, such as secret key 201 and data storage domain 160A of FIG. 1, in accordance with one or more aspects of the disclosure. The system 200 may be employed for storing one or more virtual machine disk images 210, metadata 220 and lease area 230 on the data storage domain 160A. As shown, the system 200 may also include a secret key 201 that is used to authenticate access to the data storage domain 160A. In implementations, a different secret key may be generated for each service provider associated with the storage domains (also for each user/administrator). In some cases, the user may be provided with a system prompt to enter authentication credentials 203 (e.g., a login and password) to be used to generate the secret key 201, for example, by a backend encryption process of the system 200.

The secret key 201 be represented by a data structure, such as an array, that is capable of holding data objects. In some implementations, the secret key 201 may include various type of data. For example, the secret key 201 may include a universally unique identifier (UUID) 202 to identify a particular secret key, key information 204 that may include encrypted authentication information, as well as other data objects. Upon creation of the secret key 201, system 200 may provide the UUID 202 for the key 201 to the virtualization manager, such as virtualization manager 110 of FIG. 1. The virtualization manager 110 may store this UUID 202 in a database, such as database 114 in FIG. 1, to be retrieved when access to the storage domain 160A is requested a VM that may be associated with an authorized user device.

In an illustrative example, the storage domain 160A may employ file-based storage, in which case disk images 210, domain metadata 220, and a domain lease 230, provided by respective files. In another illustrative example, example storage domain 160A may employ block-based storage, in which case disk images 210, metadata 220, and a lease area 230, provided by respective logical volumes.

Each disk image 210 (also referred to as a virtual disk) may comprise one or more volumes 240A-190N, as schematically illustrated by FIG. 1, for storing disk image data. In an illustrative example, a disk image may represent a volume chain comprising one or more copy-on-write (COW) volumes (which may also be referred to as "layers"). From the perspective of a virtual machine, these volumes 240A-240F appear as a single disk image, as the hypervisor presents the virtual disk to a virtual machine and implements the associated disk read-write operations. The virtual disk device implemented by the hypervisor locates the data by accessing, transparently to the virtual machine, each volume of the volume chain, starting from the most recently added volume.

Metadata 220 may be employed for storing references to associated volumes (e.g., to parent or child volumes in a copy-on-write chain) and/or other information that may be utilized for volume identification, management, creation, modification, removal, and/or for performing file operations with respect to the data stored on the volumes 240A-240F.

The lease area 230 may be employed for storing the information that may be utilized for managing access to the volumes 240A-240F. In certain implementations, by obtaining a lease with respect to example storage domain 160A, a host system may receive an exclusive access to the volumes 240A-240F on the storage domain that would prevent other hosts from accessing the volumes while the lease is active. A lease may have a certain expiration period and may be extended by the requestor. Failure to timely extend a lease 230 may lead to the expiration of the lease 230. The state of the current lease with respect to a given storage domain may be stored in the lease area 230 of that storage domain.

Figure 3:
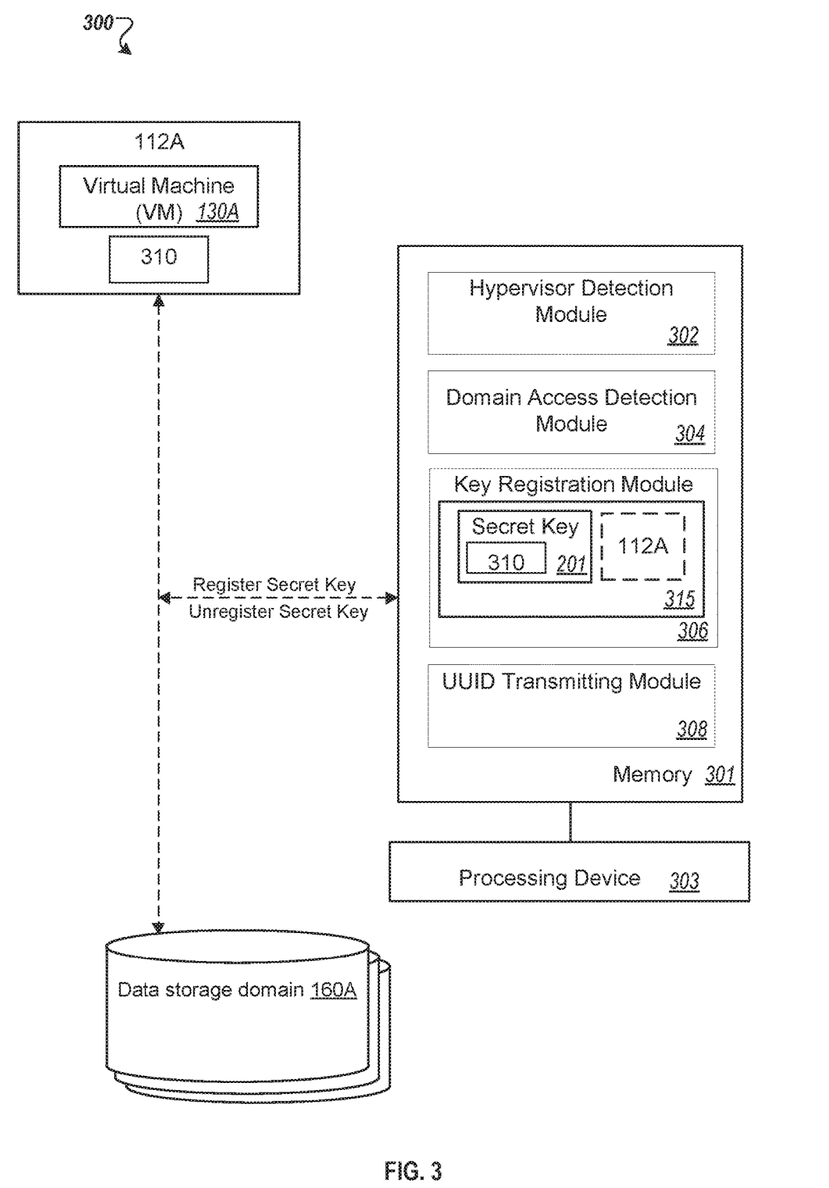
FIG. 3 is a block diagram of a system including a memory to support techniques for secret keys management in a virtualized data-center according to an implementation of the disclosure.

FIG. 3 is a block diagram of a system 300 including a memory 301 to support techniques for secret keys management in a virtualized data-center according to an implementation of the disclosure. In this example, the system includes a processing device 303 coupled to the memory 301. In some implementations, the memory 301 and processing device 303 may correspond to a memory and processing device within system architecture 100 of FIG. 1. For example, host 115 of the distributed system 100 may comprise the memory 301 and processing device 303. The processing device 303 may execute instructions stored in the memory for carrying out the operations of the modules as discussed herein.

In some implementations, system 300 may include modules for managing secret keys to access storage domains of the system 300. As shown in FIG. 3, these components may include a hypervisor detection module 302, a domain access detection module 304 a key registration module 306 and a UUID transmitting module 308. The memory 301 may include any non-persistent data storage (e.g., volatile memory), persistent data storage (e.g., flash storage, hard drive, tape), other computer-readable medium, or combination thereof that is capable of storing relevant data and instructions for carrying out the operations of the module as discussed herein.

Hypervisor detection key module 302 may detect the activation of a hypervisor, such as host manager 112A, on a host system, such as system 100. For example, the hypervisor detection key module 302 may detect when the virtualization manager 110 insatiate or otherwise installs a new hypervisor for the host system. In some implementations, a new hypervisor may be activated to reside on the host system in response to a request for a system administrator or other types of users. In some embodiments, the new hypervisor may be activated to migrate VM 130A from another host system. For example, there could be a malfunction that causes a specific host system to be slower than normal. In this case, the performance of the entire system may benefit by moving the VM from the malfunctioning host system. In other examples, the new hypervisor may be activated to achieve a certain service level agreement (SLA) for a specific client or for other types of system uses and benefits.

Domain access detection module 304 may identify the VMs that need access to a data storage domain, such as data storage domain 160A. For example, VM 130A may be arranged to store a disk image on the data storage domain 160A. In some implementations, the domain access detection module 304 may detect when the VM 130A makes a request to the virtualization manager 110 to access the data storage domain 160A or to detect instructions from the virtualization manager 110 to connect the VM 130A to the data storage domain 160A as part of an initial configuration of the VM.

In some implementations, the key registration module 306 is executed by the processing device 303 of system 300 to register a secret key, such as secret key 201, to the hypervisor (e.g., host management module 112A). In some embodiments, the secret key 201 is generated based on user provided authentication credentials that provide authenticated access to data storage domain 160A. The secret key 201 provides the VM 130A with authenticated access to the storage domain 160A. In some implementations, the secret key 201 be represented by a data structure that is capable of holding data objects. The secret key 201 may include a universally unique identifier (UUID) 301 to identify a particular secret key as well as other relevant information. This registration of the key to the hypervisor 112A by using the key registration module 304 prevents any other process running on the hypervisor 112A from being able to access the key other that the VM that needs access to the data storage domain 160A as further discussed below.

In some implementations, the key registration module 306 may identify a UUID 310 for the secret key associated with the data storage domain 160A. For example, when the secret key is generated for the data storage domain 160A, the UUID 301 and key 201 are stored in database 114. Once the UUID 310 is identified from the database, a memory data structure 315 (e.g., an index table) storing an association between the UUID 310 for the secret key 201 and the hypervisor 112A is stored in volatile memory, such as a portion of memory 301. In some implementations, the data structure 315 may include a table for holding in each row a UUID for a particular secret key, such as UUID 301, and a corresponding identifier (e.g., a memory address, IP address, process identifier, etc.), for the hypervisor registered to the key. The data structure 315 is stored in a volatile memory so that if system 300 is restarted, the memory data structure 315 is cleared from the memory.

In some implementation, if the data storage domain associated with the secret keys agent 117 is deactivated, the memory data structure 315 comprising an association between the secret key 201 and the virtual machine 130A is cleared from the volatile memory (e.g., memory 301). In such a case, when the data storage domain is reactivated, the secret keys agent 117 may execute the key registration module 304 to re-register the key 201 with the hypervisor.

In some implementations, the key registration module 306 may also be used to manually trigger the secret key to be un-registered. For example, a user, such as a system administrator, may be provided with a user prompt to indicate that the secret keys associated with a domain should be unregister because the domain is being decommissioned. In other implementations, the key registration module 306 may be triggered to unregister the secret key 201 associated with a specific storage domain, when the secret keys agent 117 receives an indication from the virtualization manger 110 that it detects the storage domain or the hypervisor associate with the domain is shut down. In response to the virtualization manger 110 detecting that the hypervisor is re-started or that the storage domain is re-booted and back on-line, the secret keys agent 117 may re-register the secret key with the relevant hypervisor.

In some implementations, key registration module 306 may also be used to unregister the secret key 201 associated with a specific storage domain. To unregister the secret key 201, the key registration module 306 may delete secret key from the database, such as database 114. The key registration module 306 may also instruct relevant hypervisors associated with the virtual machines to delete the secret key from memory. In some implementations, the key registration module 304 may instruct the virtualization manger 110 to restart the hypervisors on system 300 so the UUID's of the keys will be cleared from the volatile memory of the hypervisors.

UUID transmitting module 308 may transmit the UUID of the secret key to the hypervisor that needs access to the data storage domain, such as data storage domain 160A. For example, the UUID transmitting module 308 may transmit UUID 310 of secret key 201 to the hypervisor 112A associated with VM 130A. In turn, the hypervisor 112A provide the UUID 310 to the VM 130A o access the secret key. For example, the VM 130A may send an access request to system 300 to connect to the data storage domain 160A using the UUID 310 of the secret key for that domain. In return, the system 300 may provide the secret key 201 to the VM 130A in view of the UUID 310 received with the request, which the VM may use to access the domain.

Figure 4:
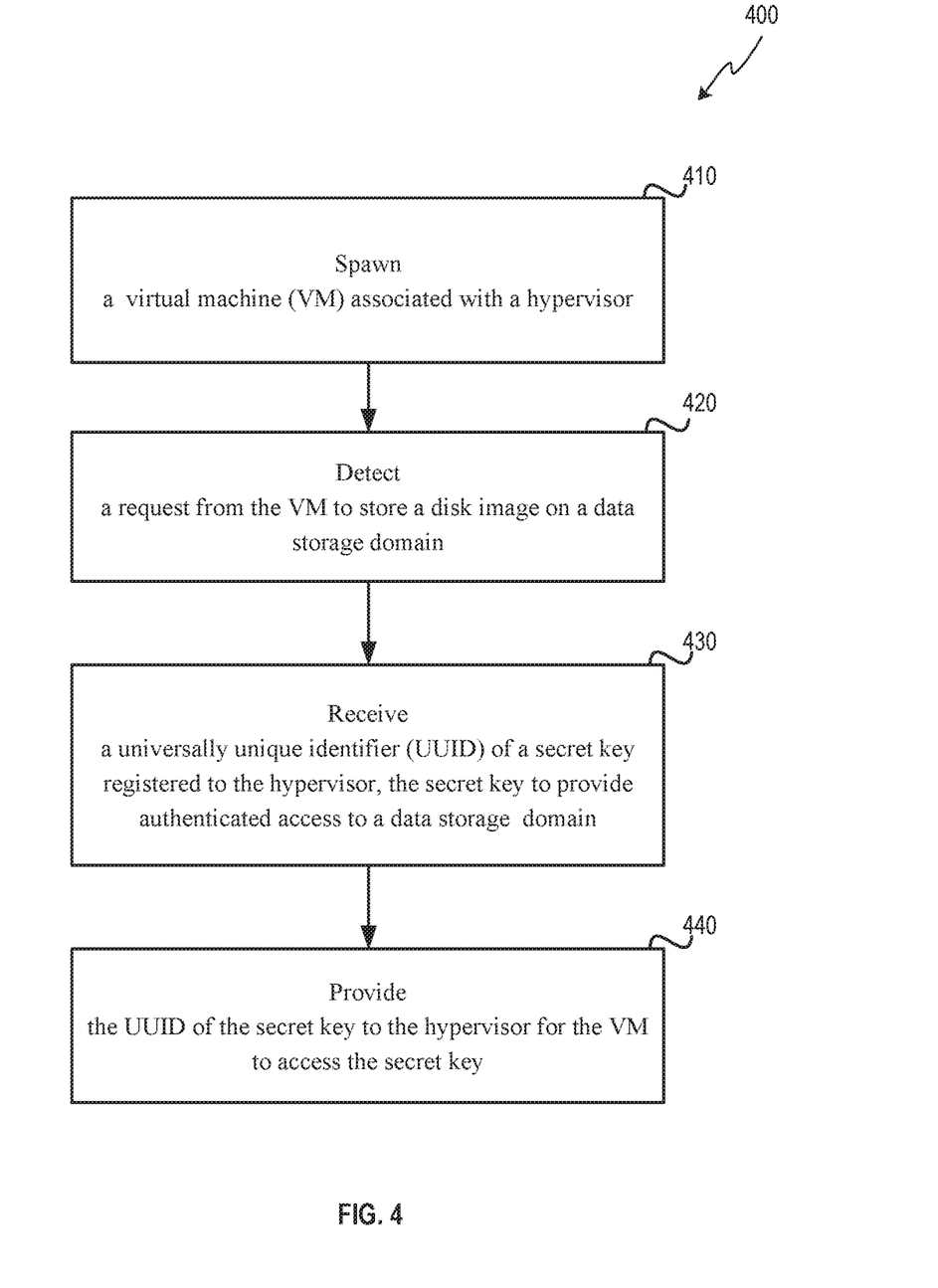
FIG. 4 illustrates a flow diagram illustrating a method of managing secret keys in a virtualized data-center according to an implementation of the disclosure.

FIG. 4 illustrates a flow diagram illustrating a method 400 of managing secret keys in a virtualized data-center according to an implementation of the disclosure. In one implementation, the processing device 303 of FIG. 3 as direct by the secret keys agent 117 of FIG. 1 may perform method 400. The method 400 may be performed by processing logic that may comprise hardware (circuitry, dedicated logic, etc.), software (e.g., software executed by a general purpose computer system or a dedicated machine), or a combination of both. In alternative implementations, some or all of the method 400 may be performed by other components of a shared storage system. It should be noted that blocks depicted in FIG. 4 can be performed simultaneously or in a different order than that depicted.

Method 400 begins at block 410 where a virtual machine (VM) associated with the hypervisor is spawned. For example, the virtualization manager 110 may generate a new hypervisor to mitigate a virtual machine to a new host system. This spawning may occur, for example, when the virtualization manager 110 attempts to move a virtual machine to a new hypervisor of the system 300. In block 420, a request from the VM to store a disk image on a data storage domain is detected.

A universally unique identifier (UUID) of a secret key registered to the hypervisor is received in block 430. For example, the UUID of the secret key may be retrieved from a database (e.g., database 114) associated with a virtualization manager, such as virtualization manager 110. The secret key that provides authenticated access to the data storage domain. For example, a user, such as a system administrator, may be provided with a system prompt to enter authentication information (e.g., a login and password). The authentication information includes access information associated with a data storage domain.

In block 440, the UUID of the secret key is provided to the hypervisor for the VM to access the secret key. For example, the VM transmit the UUID to the secret keys agent 117 associated with virtualization manager 110. In turn, the secret keys agent 117 may then transmit the secret key identified by the UUID to the VM for it to gain authenticated access to the storage domain.

Figure 5:
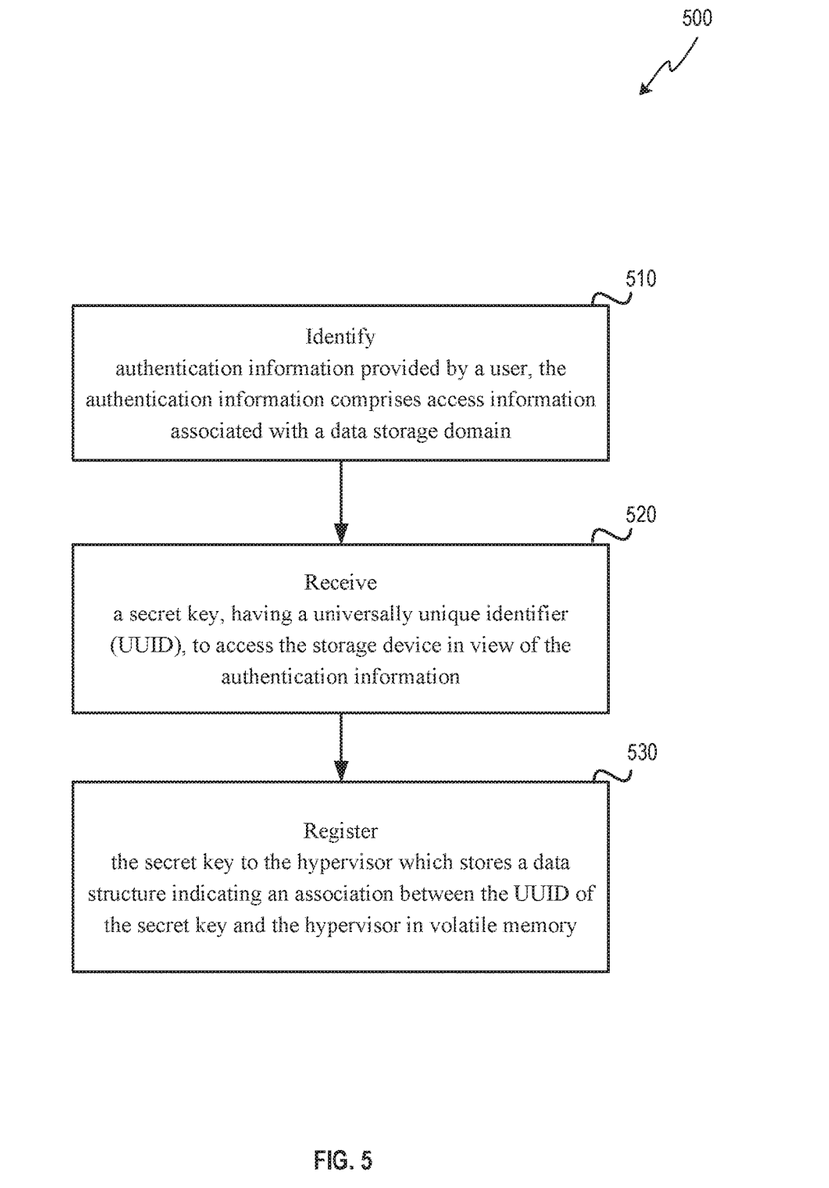
FIG. 5 illustrates a flow diagram illustrating another method of managing secret keys in a virtualized data-center according to an implementation of the disclosure.

FIG. 5 illustrates a flow diagram illustrating another method 500 of managing secret keys in a virtualized data-center according to an implementation of the disclosure. In one implementation, the processing device 303 of FIG. 3 as direct by the secret keys agent 117 of FIG. 1 may perform method 400. The method 500 may be performed by processing logic that may comprise hardware (circuitry, dedicated logic, etc.), software (e.g., software executed by a general purpose computer system or a dedicated machine), or a combination of both. In alternative implementations, some or all of the method 500 may be performed by other components of a shared storage system. It should be noted that blocks depicted in FIG. 5 can be performed simultaneously or in a different order than that depicted.

Method 500 begins at block 510 where authentication information provided by a user is identified. The authentication information includes access information associated with a data storage domain. In block 520, a secret key, having a universally unique identifier (UUID), to access the data storage domain is received in view of the authentication information. This secret key provides the VM authenticated access to the data storage domain. In block 530, the secret key is registered to the hypervisor which stores a data structure indicating an association between the UUID of secret key and the hypervisor in volatile memory associated with a processing device, such as processing device 303, so that the VM has exclusive access to the secret key. In this regard, the registration prevent access to the secret key to other VMs associated with the hypervisor because the other VMs will not have access to the UUID.

Figure 6:
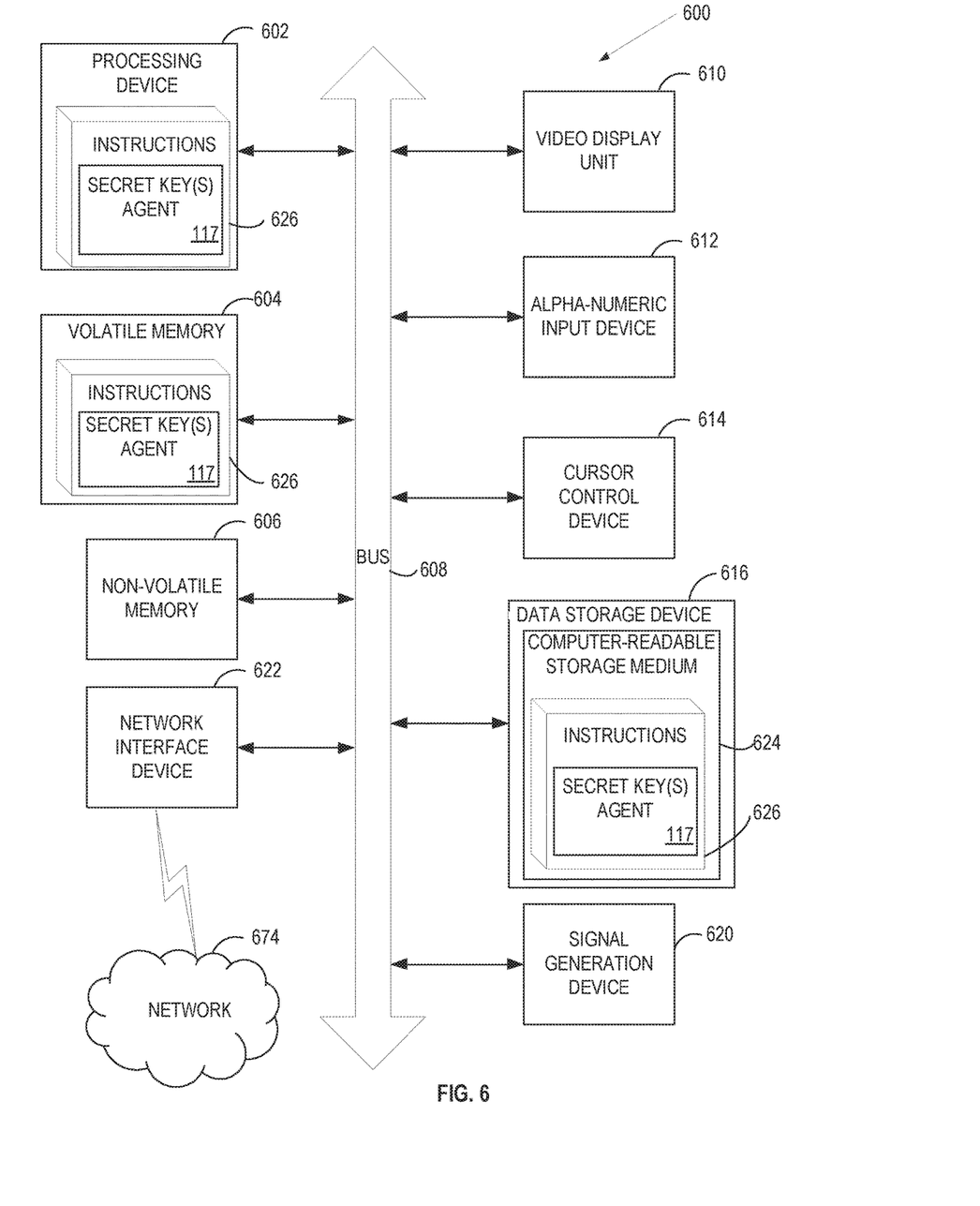
FIG. 6 illustrates a block diagram illustrating a computer system in which implementations of the disclosure may be used.

FIG. 6 depicts a block diagram of a computer system operating in accordance with one or more aspects of the disclosure. In various illustrative examples, computer system 600 may correspond to a processing device within system 100 or system 300 of FIG. 1 and FIG. 3 respectively. The computer system may be included within a data center that supports virtualization. Virtualization within a data center results in a physical system being virtualized using virtual machines to consolidate the data center infrastructure and increase operational efficiencies.

A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine/host device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for managing secret keys in a virtualized data-center.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage domain 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage domain 616 may include a non-transitory computer-readable storage medium 624 on which may store instructions 626 encoding any one or more of the methods or functions described herein, including instructions encoding the secret keys agent 117 of FIG. 1 for implementing method 400 of FIG. 4 or method 500 of FIG. 5.

Instructions 626 may also reside, completely or partially, within volatile memory 604 and/or within processing device 602 during execution thereof by computer system 600, hence, volatile memory 604 and processing device 602 may also constitute machine-readable storage media.

While non-transitory computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "selecting," "determining," "deleting," "removing," "identifying," "generating" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the disclosure is not limited to the examples and implementations described. The scope of the disclosure should be determined with reference to the following claims, along with the full scope of equivalents to which the claims are entitled.

What is claimed is:

1. A system comprising:
a memory to store secret key data; and
a processing device coupled to the memory, to:
    detect activation of a hypervisor on a host system;
    detect a request from a virtual machine (VM) associated with the hypervisor to access a data storage domain;

identify a secret key providing authenticated access to the data storage domain, wherein the secret key comprises a universally unique identifier (UUID);

generate a data structure indicating an association between the UUID of the secret key and the hypervisor;

register the secret key to the hypervisor, wherein to register the secret key, the processing device to store the data structure in a volatile memory associated with the processing device; and transmit the UUID of the secret key to the hypervisor for the VM to access the secret key.

2. The system of claim 1, wherein the processing device is further to responsive to detecting a re-start of the hypervisor, re-register the secret key.

3. The system of claim 1, wherein the processing device is further to responsive to user input, unregister the secret key from the hypervisor.

4. The system of claim 1, wherein the processing device is further to responsive to detecting a deactivation of the data storage domain, unregister the secret key from the hypervisor.

5. The system of claim 4, wherein to unregister the secret key, the processing device is further to delete the data structure from the volatile memory.

6. The system of claim 5, wherein the processing device is further to responsive to detecting a re-boot of the data storage domain, re-register the secret key with the hypervisor.

7. A method comprising:

detecting, by a processing device, a request from a virtual machine (VM) associated with a hypervisor to access a data storage domain;

identifying, by the processing device, a secret key providing authenticated access to the data storage domain, wherein the secret key comprises a universally unique identifier (UUID);

generating, by the processing device, a data structure indicating an association between the UUID of the secret key and the hypervisor;

registering, by the processing device, the secret key to the hypervisor, wherein to register the secret key, the processing device is to store the data structure in a volatile memory associated with the processing device; and transmitting, by the processing device, the UUID of the secret key to the hypervisor for the VM to access the secret key.

8. The method of claim 7, further comprising responsive to detecting a re-start of the hypervisor, re-registering the secret key.

9. The method of claim 7, further comprising responsive to user input, unregistering the secret key from the hypervisor.

10. The method of claim 7, further comprising, responsive to detecting a deactivation of the data storage domain, unregistering the secret key from the hypervisor.

11. The method of claim 10, wherein unregistering the secret key further comprises deleting the data structure from the volatile memory.

12. The method of claim 11, further comprising, responsive to detecting a re-boot of the data storage domain, re-registering the secret key with the hypervisor.

13. A non-transitory machine-readable storage medium including instructions that, when executed by a processing device, cause the processing device to:

detect, by the processing device, activation of a hypervisor on a host system;

detect a request from a virtual machine (VM) associated with the hypervisor to access a data storage domain;

identify a secret key providing authenticated access to the data storage domain, wherein the secret key comprises a universally unique identifier (UUID);

generate a data structure indicating an association between the UUID of the secret key and the hypervisor;

register the secret key to the hypervisor, the secret key comprises a universally unique identifier (UUID), wherein to register the secret key, the processing device to store the data structure in a volatile memory associated with the processing device; and transmit the UUID of the secret key to the hypervisor for the VM to access the secret key.

14. The non-transitory machine-readable storage medium of claim 13, wherein the processing device is further to responsive to detecting a re-start of the hypervisor, re-register the secret key.

15. The non-transitory machine-readable storage medium of claim 13, wherein the processing device is further to responsive to user input, unregister the secret key from the hypervisor.

16. The non-transitory machine-readable storage medium of claim 13, wherein the processing device is further to responsive to detecting a deactivation of the data storage domain, unregister the secret key from the hypervisor.

17. The non-transitory machine-readable storage medium of claim 16, wherein to unregister the secret key, the processing device is further to delete the data structure from the volatile memory.

18. The non-transitory machine-readable storage medium of claim 17, wherein the processing device is further to responsive to detecting a re-boot of the data storage domain, re-register the secret key with the hypervisor.

* * * * *